United States Patent
Thibault et al.

(10) Patent No.: US 8,885,903 B2
(45) Date of Patent: Nov. 11, 2014

(54) METHOD AND APPARATUS FOR STATISTICAL ITERATIVE RECONSTRUCTION

(75) Inventors: Jean-Baptiste Thibault, Waukesha, WI (US); Jiang Hsieh, Brookfield, WI (US); Thomas Matthew Benson, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 13/298,243

(22) Filed: Nov. 16, 2011

(65) Prior Publication Data

US 2013/0121553 A1 May 16, 2013

(51) Int. Cl.
- G06K 9/00 (2006.01)
- G06T 11/00 (2006.01)
- G06K 9/36 (2006.01)

(52) U.S. Cl.
CPC ............... *G06K 9/36* (2013.01); *G06T 11/003* (2013.01)
USPC ......................................................... 382/131

(58) Field of Classification Search
None
See application file for complete search history.

(56) References Cited

U.S. PATENT DOCUMENTS

| | | | |
|---|---|---|---|
| 6,529,575 B1 | 3/2003 | Hsieh | |
| 6,718,068 B1 | 4/2004 | Gindele et al. | |
| 7,356,174 B2 | 4/2008 | Leue et al. | |
| 7,548,604 B2 * | 6/2009 | De Man et al. | 378/17 |
| 8,111,889 B2 * | 2/2012 | Basu et al. | 382/131 |
| 2005/0226484 A1 * | 10/2005 | Basu et al. | 382/131 |
| 2005/0286749 A1 | 12/2005 | De Man et al. | |
| 2008/0165920 A1 * | 7/2008 | De Man et al. | 378/17 |
| 2009/0190814 A1 | 7/2009 | Bouman et al. | |
| 2011/0150305 A1 | 6/2011 | Zeng et al. | |
| 2012/0057770 A1 * | 3/2012 | Jang et al. | 382/132 |
| 2013/0121553 A1 * | 5/2013 | Thibault et al. | 382/131 |
| 2013/0177225 A1 * | 7/2013 | Zamyatin et al. | 382/131 |

FOREIGN PATENT DOCUMENTS

| WO | 0230100 A2 | 4/2002 |
|---|---|---|
| WO | WO0230100 * | 4/2002 |
| WO | 02067201 A1 | 8/2002 |
| WO | WO02067201 * | 8/2002 |

OTHER PUBLICATIONS

Anastasio et al., A new reconstruction approach for reflection mode diffraction tomography, IEEE transaction, pp. 1262-1271, vol. 9, Issue:7, Jul. 2000, Date of Current Version : Aug. 6, 2002.

* cited by examiner

*Primary Examiner* — Tahmina Ansari
(74) *Attorney, Agent, or Firm* — Dean D. Small; The Small Patent Law Group (57) ABSTRACT

Methods and apparatus for statistical iterative reconstruction are provided. One method includes pre-processing acquired raw measurement data to modify the raw data measurement data and determining a change in a variance of the raw measurement data resulting from the modification to the raw measurement data during pre-processing. The method also includes reconstructing an image using the modified raw measurement data resulting from the pre-processing and the determined change in variance.

27 Claims, 3 Drawing Sheets

METHOD AND APPARATUS FOR STATISTICAL ITERATIVE RECONSTRUCTION

BACKGROUND

Data reconstruction methods may be used to reconstruct images from acquired data of an object. For example, in Computed Tomography (CT) imaging, projection rays are used as the acquired CT data to reconstruct images. Traditionally, images have been reconstructed from CT data using direct reconstruction algorithms such as filtered back projection (FBP) techniques. However, iterative reconstruction algorithms are also used in the reconstruction of images with application to CT images.

Iterative reconstruction methods are known to include statistical weighting for each projection ray in order to improve the signal-to-noise ratio or to provide other beneficial characteristics. For example, each ray may be weighted by an approximation to the inverse of the variance measurement of the ray. However, as the data is modified to correct for certain non-idealities (e.g., as the data is "prepped"), the variance of that data will be modified.

Thus, although statistical weighting can be used to increase the signal-to-noise ratio of a reconstruction, reasonable approximations of the variance measurements are needed in order to provide consistent results with varying tube voltage, patient size, gantry pre-filter (bowtie), etc. Known methods for determining approximations for the variances often do not result in completely accurate results, thus, reducing the robustness of the statistical iterative reconstruction.

BRIEF DESCRIPTION

In one embodiment, a non-transitory computer readable storage medium for reconstructing image data using a processor is provided. The non-transitory computer readable storage medium includes instructions to command the processor to pre-process acquired raw measurement data to modify the raw measurement data and determine a change in a variance of the raw measurement data resulting from the modification to the raw measurement data during pre-processing. The non-transitory computer readable storage medium includes instructions to further command the processor to reconstruct an image using the modified raw measurement data resulting from the pre-processing and the determined change in variance.

In another embodiment, a method for statistically iteratively reconstructing image data is provided. The method includes processing acquired measurement data to correct for at least one non-ideality of the acquired raw measurement data, wherein the processing is performed in a first data flow resulting in pre-processed measurements. The method also includes determining in a second different data flow a change in variance of the raw measurement data resulting from the correction in the first data flow. The method further includes reconstructing an image based on the corrected raw measurement data and the determined variance in the pre-processed measurements.

In a further embodiment, an imaging system is provided that includes an imaging device and a processor coupled to the imaging device to receive raw measurement data from the imaging device. The processor is configured to modify the raw measurement data during pre-processing, determine a change in a variance of the raw measurement data resulting from the modification to the raw measurement data during the pre-processing, and reconstruct an image using the modified raw measurement data from the pre-processing and the determined change in variance in the pre-processed raw measurement data.

In yet another embodiment, a non-transitory computer readable storage medium for reconstructing image data using a processor is provided. The non-transitory computer readable storage medium includes instructions to command the processor to pre-process acquired raw measurement data to modify the raw measurement data and determine a change in a variance of the raw measurement data resulting from the modification to the raw measurement data during pre-processing. The non-transitory computer readable storage medium also includes instructions to command the processor to modify the pre-processed raw measurement data based on the determined change in variance.

DETAILED DESCRIPTION

The following detailed description of various embodiments will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

Described herein are various embodiments for data reconstruction including reconstructing an image using exemplary methods or algorithms. The images in various embodiments are composed of a plurality of image elements. As used herein, the term "image element" generally refers to an element of an object within the image space array. For example, an image element may include an image pixel or picture element that can correspond to a single voxel or volume element in a three-dimensional (3D) reconstruction.

As used herein, raw measurement data generally includes data acquired by the imaging system. For example, in a Computed Tomography (CT) system, the raw measurement data is line (or projection) attenuation measurements corresponding to x-ray projections through an object. Additionally, as used herein, image data generally includes data that has been reconstructed. For example, image data may correspond to the output of an image reconstruction process. In various embodiments, raw measurement data (or raw data) corresponds to photon or x-ray counts before performing a logarithmic (log) operation and line (or projection) attenuation measurements corresponds to data after performing a log operation as described in more detail herein. Thus, image data in various embodiments refers to data during or after image reconstruction and raw data refers to data before image reconstruction, for example, projection data, sinogram data, etc.

More particularly, various embodiments provide statistical iterative reconstruction that includes methods for determining or approximating change in a variance of acquired data that has been modified. For example, the acquired data is generally modified to correct for certain non-idealities (e.g., as the data is "prepped" or prepared) resulting in a corresponding modification to the variance of that data. In at least one embodiment, the variance is modified to account for one or more preparation or "prep" steps, for example, to accommodate for varying tube voltage, tube current, patient size, gantry pre-filter (bowtie), transformation from measurement counts to projection attenuation measurements via Beer's law of attenuation, scatter, physical beam hardening, etc. At least one technical effect of various embodiments is an increased accuracy of an approximation or estimate of the change in variance of the processed data through the "prep" steps, and/or an increased robustness of the statistical iterative reconstruction associated with more accurate statistical modeling.

It should be noted that although the various embodiments are described in connection with a particular type of data, such as Computed Tomography (CT) data, the various embodiments may be used in connection with any type of data. Thus, the various embodiments may be used in connection with data from different types of medical imaging modalities and for non-medical applications, such as security applications, industrial inspection applications, among others.

Figure 1:
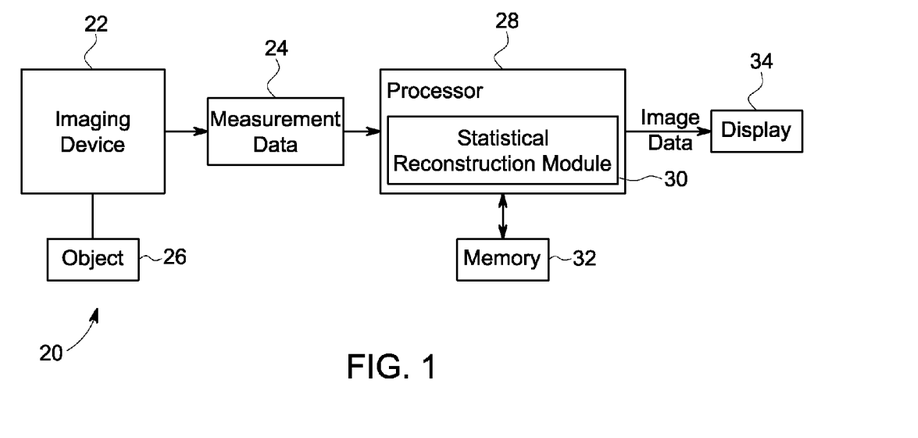
FIG. 1 is a simplified block diagram of a system formed in accordance with various embodiments.

FIG. 1 is a simplified block diagram of a system 20 formed in accordance with various embodiments. The system 20 is illustrated as an imaging system 20. However, the system 20 may also be a data acquisition system or processing system.

The system 20 includes an imaging device 22, which may be any type of imaging scanner. For example, in one embodiment, the imaging device 22 is a CT scanner. However, the imaging device 22 may be imaging scanners used in different x-ray modalities or other non-x-ray modalities. The imaging device 22 is configured to acquire line integral attenuation measurement data 24 of an object 26 (e.g., a patient), referred to herein as measurement data 24. The measurement data 24 may be acquired using any suitable data acquisition technique or procedure and may include one-dimensional, two-dimensional or three-dimensional measurement data that may be defined as a measurement data set.

The measurement data 24 is communicated to a processor 28, which may form part of a computing machine, such as a workstation, which may be connected to or remote from the imaging device 22. The processor 28 may perform real-time or off-line processing of the received measurement data 24.

The processor 28 includes a statistical reconstruction module 30 that may be embodied in software, hardware or a combination thereof. The statistical reconstruction module 30 performs a statistical iterative reconstruction of the measured projection attenuation data, namely the measurement data 24 using multiple processing paths or chains as described in more detail herein. The results of the reconstruction is image data that may be stored in a memory 32 and displayed on a display 34, for example, as an image of the object 26 or a portion of the object 26.

Figure 2:
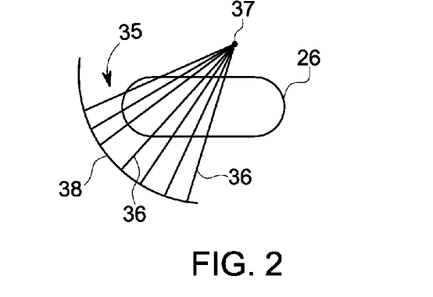
FIG. 2 is a diagram illustrating projection rays.

In an x-ray application, for example, when the imaging device 22 is a CT scanner and the object 26 is, for example, a patient, a fan 35 of individual x-rays 36 from an x-ray source 37 (e.g., x-ray tube source) pass through different lengths of the object 26 before impinging on a detector 38 as shown in FIG. 2. Accordingly, a different amount of interaction between each of the x-rays 36 and the object 26 results depending on when and where the x-rays 36 hit the object 26. Various embodiments provide statistical iterative reconstruction of the object 26 (or a portion thereof) that uses modeling of the variance of the data for the x-rays 36, and more particularly, accounts for changes in the variance as a result of the modifications of the data. In general, a weighting is applied to the projection data resulting from the x-rays 36 passing through the object 26 and detected by the detector 38, which is then used in a suitable inversion process to reconstruct images of the object 26. In particular, the projection data is defined by vector Y and the image data is defined by vector X, such that a transformation operator A is used to model the transformation from X to Y, such that Y=AX. Thus, in order to solve for X to reconstruct the image, an inversion is performed. In various embodiments, a quadratic form equation may be defined as: $(Y-AX)^T W (Y-AX)$, where $(Y-AX)^T$ is the transpose of $(Y-AX)$ with Y defining the acquired projection data, and X the image data to solve for, with W being the statistical weighting matrix. In some embodiments, the equation is minimized, for example, using a weighted least squares method to solve a maximum likelihood problem, or using a penalized weighted least squares method to solve a maximum a posteriori problem.

Figure 3:
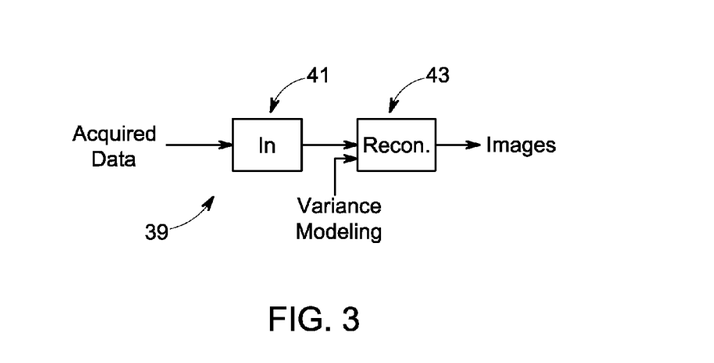
FIG. 3 is a block diagram illustrating a process flow of a negative logarithmic operation in accordance with various embodiments.

The various embodiments may be used to solve for the elements of W (e.g., coefficients of matrix W) to be used during image reconstruction. For example, in a CT imaging application, the inverse variance of the measured data at the detector level is determined to form the diagonal elements of matrix W. In particular, a negative log operation is used to determine attenuation measurements from photon counts (e.g., x-ray photon counts detected by the detector 38) after normalization by the input flux. For example, as shown in the process flow 39 of FIG. 3, a negative log(−log) operation 41 is applied to the ratio of the photon count data over the nominal dosage, which may be integrated over time, in accordance with Beer's law of attenuation. The −log operation 41 is a data pre-processing step as described in more detail herein. In various embodiments, the output of the −log operation 41 (including projection data Y) is used with variance modeling data (contributing to the matrix W) generated in accordance with various embodiments in a reconstruction process 43 to generate images. It should be noted that any suitable preprocessing and reconstruction method may be used.

Figure 4:
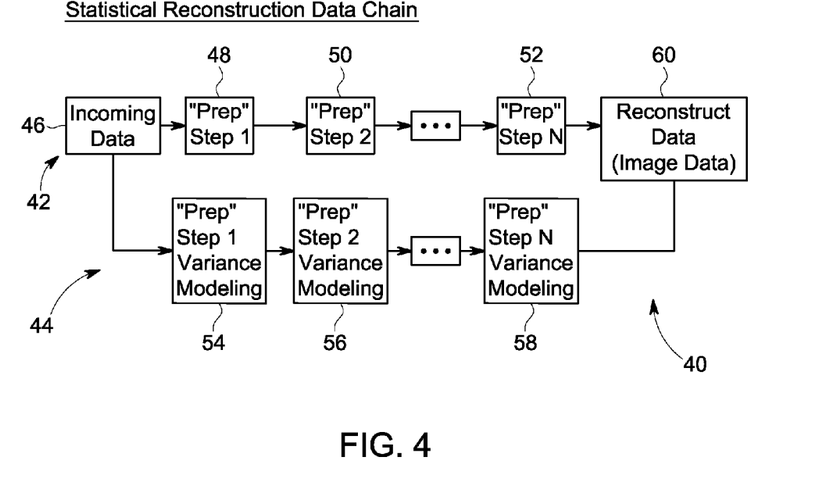
FIG. 4 is a block diagram illustrating a process flow for a statistical iterative reconstruction in accordance with various embodiments.

In various embodiments, as shown in the process flow 40 of FIG. 4, a statistical iterative reconstruction includes a plurality of data processing flow paths or chains, which is illustrated as two flow paths 42 and 44, which may be parallel flow paths providing parallel processing. It should be noted that the processing in the flow paths 42 and 44 may be performed concurrently or simultaneously. However, in some embodiments, all or a portion of the processing in the flow paths 42 and 44 may be performed sequentially. It also should be noted that the flow path 42 and/or the flow path 44 may be performed using one or more processors.

The statistical iterative reconstruction performed in accordance with various embodiments generally provides variance modeling for iterative data reconstruction. In some embodiments, noise may be reduced in the reconstructed image volume according to statistical noise modeling of the projection attenuation measurement data input to the reconstruction operator. In one embodiment, the flow path 42 modifies incoming data 46 (e.g., the measurement data 24 shown in FIG. 1) such as to correct for non-idealities, and the flow path 44 computes or approximates the variance of the data resulting from the modification. Thus, the flow path 44 in various embodiments approximates the impact of the modification by the flow path 42 on the variance of the measurements. It should be noted that different steps of the process may be differently modeled as described in more detail below.

As shown in FIG. 4, a plurality of preparation steps 48, 50 and 52, which may include up to N steps, are performed to modify the incoming data. For example, the preparation steps 48, 50 and 52 may be used to modify the data for different variations, such as varying tube voltage, tube current, patient size, gantry pre-filter, etc. in a CT application. Additionally, corresponding variance modeling steps 54, 56 and 58, which may include up to N steps are performed and used to modify the variance estimate to account for the modification resulting from the preparation steps 48, 50 and 52. In one embodiment, the number of preparation steps 48, 50 and 52 are the same as the number of the variance modeling steps 54, 56 and 58, however, the number of steps may be different.

Thus, each of the preparation steps 48, 50 and 52 generally provides some type of correction for the data 46 and the variance modeling steps 54, 56 and 58 provide an estimation of the variation of the data 46 output by each preparation step, for example, an estimation of the variation of projection data in a CT application. Accordingly, the process flow 40 calculates the variance of the data 46 (e.g., a modification in the variance resulting from prepping the data 46), as well as the data 46.

The multi-flow path process flow 40 in various embodiments provides joint variance estimation matched to a given data preparation chain, for example, defined by the preparation steps 48, 50 and 52 to account for interaction effects, which are together used to provide reconstructed data 60. The joint variation estimation may be provided using different methods of various embodiments, such as by using energy-weighted modeling, pre-log corrections, post-log correction and beam-hardening corrections as energy-weighted modeling, among others.

Figure 5:
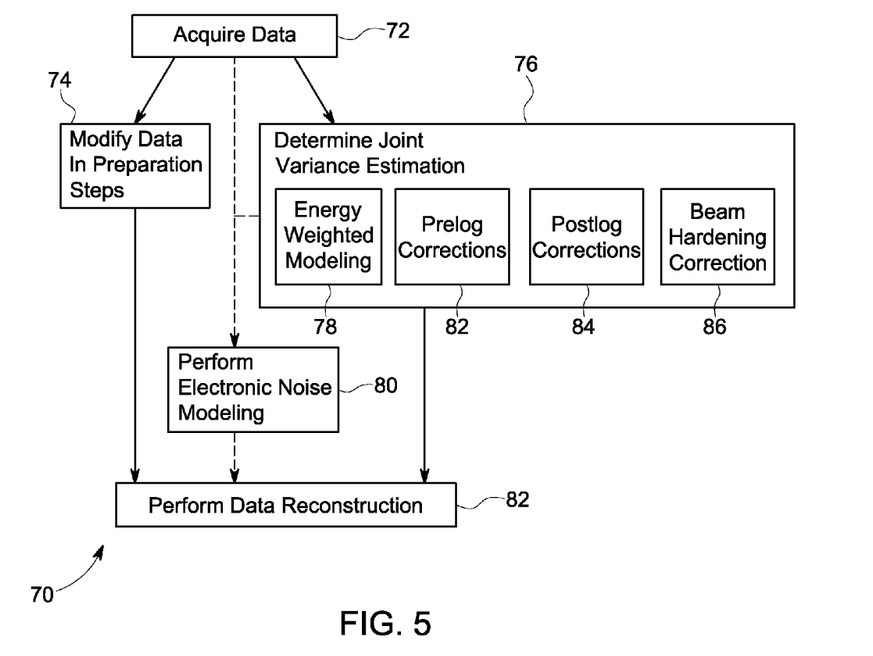
FIG. 5 is a flowchart of a method for variance modeling for image reconstruction in accordance with various embodiments.

More particularly, various embodiments provide a method 70 for variance modeling as shown in FIG. 5, which may be used for data reconstruction (e.g., image reconstruction). The method 70 includes acquiring data at 72, for example, projection data. For illustrative purposes only, the data acquired 72 may be CT data acquired by a CT imaging system or a multi-modality imaging system for example, a Single-Photon Emission Computed Tomography (SPECT/CT) system, a Position Emission Tomography/Computed Tomography (PET/CT) system, or a Magnetic Resonance Imaging (MRI) system.

Thereafter, the data correction is determined and a variance of the modified data (e.g., resulting from the modification) is also determined. These two processes may be performed concurrently as described herein, for example, in parallel data paths. The data correction includes modifying the data in one or more preparation steps at 74. For example, corrections may be made for variations in system or acquisition parameters (or object parameters) using any suitable method.

The determination of the variance of the modified data includes determining a joint variance estimation at 76, which may include different types of variance modeling as described below. A general description of a monochromatic case will first be described. In particular, for a CT application, if a monochromatic source is initially assumed, then the detected photon count $N_d$ is given by Beer's Law: $N_d = N_0 \exp(-\int \mu(s)ds)$ where $N_0$ is the source photon count, and s parameterizes an x-ray path length through some object with attenuation coefficients given by $\mu(s)$. This equation can be rearranged as $\int \mu(s)ds = -\ln N_d/N_0$. Moreover, adding a bias b to the measurements of both $N_0$ and $N_d$ and the associated correction results in line integrals $\int \mu(s)ds = -\ln (N_d-b)/(N_0-b)$.

The variance of these line integrals is then determined. In particular, random variables X and Y are defined as X=aY where Y corresponds to realizations of $N_d-b$ and a is $N_0-b$. Then, $f(X) = -\ln(X)$ and $\text{Var}[f(X)]$ can be approximated as:

$$\text{Var}[f(X)] \approx [f'(E[X])]^2 \qquad \text{Eq. 1}$$

Where E[X] and Var[X] are the expected value and variance of the corresponding random variable, respectively.

Thereafter, using a second order Taylor expansion results in:

$$\begin{aligned}
\text{Var}[-\ln(X)] &\approx [f'(E[X])]^2 \text{Var}[X] \qquad \text{Eq. 2}\\
&= \left(\frac{-1}{E[X]}\right)^2 \text{Var}[X]\\
&= \left(\frac{-1}{E[X]}\right)^2 \text{Var}[X]\\
&= \frac{1}{a^2 E[Y]^2} a^2 \text{Var}[Y]\\
&= \frac{\text{Var}[Y]}{E[Y]^2}.
\end{aligned}$$

Then assume that Y is Poisson-distributed so that E[Y]=Var[Y] and that a particular measurement $y_i$ is equal to E[Y], then. $\text{Var}[f(X)] \approx 1/y_i$, or the variance of the line integral corresponding to a projection ray is approximately inversely equal to the number of detected photons, corrected by any system-level bias b. Thus, the photon number count from the detector is converted from photon count units to units of attenuation.

The variance modeling to determine the joint variance estimation at 76 incorporates an x-ray spectrum model. Thus, in one embodiment, energy weight modeling is performed at 78. In particular, a line integral variance which is an energy-weighted modeling for a polychromatic case is determined. The energy weighted modeling calculates statistical weights for the projection rays in the CT data set before determining a weighting matrix for reconstructing the image data 60.

Specifically, the detected number of photons may be parameterized by energy as follows:

$$N_d(e) = N_0(e)\exp(-\int \mu(e)ds), \qquad \text{Eq. 3}$$

where e is the energy of the measured photons as determined by a particular realization of the polychromatic x-ray spectrum used during data acquisition.

It should be noted that Equation 3 is equivalent to the monochromatic case for any fixed e. When the x-ray spectrum is polychromatic, then ideally a total photon count given by $\Sigma_e N_d(e)$ for the relevant range of photon energies e is received. In the case of energy-weighted detection, $\Sigma_e k \cdot e \cdot N_d(e)$ is actually received where k is assumed to be a gain factor. It should be noted that it is assumed that k does not depend on e, but there may be some dependence. Thereafter, the mean energy for the projection ray is defined as:

$$\overline{e}_i = \frac{\sum_e k \cdot e \cdot N_i(e)}{\sum_e N_i(e)} \Rightarrow \sum_e k \cdot e \cdot N_i(e) = \overline{e}_i \sum_e N_i(e) \quad \text{Eq. 4}$$

Then repeating the line integral variance described above for the monochromatic case, where $y_i$ is now $\overline{e}_i \Sigma_e N_i(e)$, results in:

$$\begin{aligned} \text{Var}[-\ln(X)] &\approx \frac{\text{Var}[Y]}{E[Y]^2} \\ &= \frac{\overline{e}^2 \sum_e \text{Var}[N_i(e)]}{\left[\overline{e} \sum_e E[N_i(e)]\right]^2} \\ &= \frac{\overline{e}^2 \sum_e N_i(e)}{\overline{e}^2 \left[\sum_e N_i(e)\right]^2} \\ &= \frac{1}{\sum_e N_i(e)}. \end{aligned} \quad \text{Eq. 5}$$

However, it should be noted that the available data may take the following form:

$$y_i = \sum_e k \cdot e \cdot N_i(e) \quad \text{Eq. 6}$$

Accordingly, $\overline{e}$ is estimated to approximate the corresponding variance. In one embodiment, $\overline{e}$ is approximated based on the known source spectrum, the gantry filter or bowtie, the attenuation path length through the patient, and knowledge of the system gain factor k. Then, let the approximation be $\hat{e} \approx \overline{e}$, and the measured signal $y_i$ is divided by $\hat{e}$ in order to compute the variance. Thus, $y_i$ is not used directly as in the monochromatic case. Additionally, a number is generated that is proportional to the variance independently of all other factors (e.g., tube voltage, tube current, bowtie, patient size, etc.) to allow subsequent selection of a strength for the regularization terms in the iterative reconstruction that can compensate for such scaling factors.

Additionally, electronic noise (e.g., generated by the electronics of the data acquisition chain of the CT system) may be accounted or compensated for as described below to scale the variance computed as described above and the electronic noise into a consistent domain. Thus, electronic noise modeling may be performed at 80. To perform the electronic noise modeling, the electronic noise standard deviation can be converted from electrons to an equivalent number of photons at $\overline{e}$, or if converted to a domain proportional to photons, then that constant of proportionality may be included in the conversion.

Thus, variations and modifications are contemplated, such as modeling other behavior that is not included in the preparation steps 48, 50 and 52 (shown in FIG. 4). For example, the electronic noise modeling component may be included in the statistical weights, for example, when the data is CT data. The electronic noise modeling may be applied at any point between the incoming data 46 and the reconstruction of the image data 60 (shown in FIG. 4). However, it should be noted that the electronic noise standard deviation is scaled for a given domain (e.g., photons, proportional-photons, electrons, etc.).

Thus, in addition to the Poisson noise in the photon domain, there is electronic noise in the electron domain that is introduced during the signal acquisition. This noise may be assumed to be Gaussian with a zero-mean and independent of tube voltage, tube current, view integration time, etc. In one embodiment, the standard deviation of the electronic noise is assumed to be $\sigma_e$. The electronic noise can then be converted from electrons to an equivalent number of photons at a monochromatic energy E. Then, the variance of measurement $y_i$ is approximately $\text{Var}[Y] \approx Y + \sigma_{e,E}^2$ while the mean is $E[Y]$. Accordingly, the line integral variance calculation described above may be replaced by the following:

$$\begin{aligned} \text{Var}[-\ln(X)] &\approx \frac{\text{Var}[Y]}{E[Y]^2} \\ &\approx \frac{Y + \sigma_{e,E}^2}{Y^2}. \end{aligned} \quad \text{Eq. 7}$$

It should be noted that in various embodiments the inverse of the model is used as a statistical weight, so that Y is scaled by $$\frac{Y}{Y + \sigma_{e,E}^2}.$$

Referring again to the determination of joint variance and estimation and projection pre-processing at 76, this estimation may include determining pre-log corrections at 82. For example, a pre-log filtering variance may be determined. In one embodiment, a pre-log filtering variance determination may be used to determine corrections applied prior to the log function, such as filtering operation to control noise, scaling operation, etc.

In particular, for this correction, the value of $y_i$ is modified as follows:

$$\hat{X}_i = \sum_k \alpha_{k,i} y_{k,i} \quad \text{Eq. 8}$$

Then, similar to other embodiments described herein, the variance is defined as:

$$\text{Var}[\hat{X}_i] = \frac{\sum_k \alpha_k^2 \text{Var}[Y_k]}{\left[\sum_k \alpha_k E[Y_k]\right]^2} \quad \text{Eq. 9}$$

where $\hat{X}_i$ is the random variable corresponding to Equation 8 and similar to other embodiments and $\text{Var}[Y_k]$ and $E[Y_k]$ are defined as described herein for the monochromatic and polychromatic cases, respectively. It should be noted that a also depends on i in Equation 9, but that dependence is not shown in the equation for simplicity.

The determination of joint variance estimation at 76 may include determining post-log corrections at 84. For example, a post-log filtering variance may be determined. In one embodiment, the post-log filtering variance determination may be used to account for corrections applied after the log function, such as beam-hardening correction, smoothing filters for noise reduction, rebinning operations, etc. It should be noted that in some embodiments the determination at 84 applies to any polynomial correction. However, the determination at 84 in other embodiments may apply to non-polynomial correction, for example, non-polynomial post-log filtering.

For example, an nth order polynomial beam-hardening correction function, $S(p_i)$ may be used. In this example, assume $S(p_i)$ is defined as follows:

$$S(p_i) = \sum_{k=1}^{n} a_{k,i} p_i^k. \qquad \text{Eq. 10}$$

where n defines the polynomial order, $a_{k,i}$ is the polynomial correction and $p_i^k$ is the input projection data.

In this example, the variance of $S(P_i)$ is approximated using a second order Taylor expansion as $\text{Var}[S(P_i)] = (S'[E(P_i)]))^2 \text{Var}[P_i]$ where $P_i$ is a random variable corresponding to $p_i$. Additionally, $P_i$ is assumed to have an expected value of $p_i$ and a variance defined by $1/y_i$ where $1/y_i$ may have been modified as described herein.

The first derivative of $S(p_i)$ is then:

$$\sum_{k=1}^{n} k a_{k,i} P_i^{k-1} \qquad \text{Eq. 11}$$

Thus, the variance is defined as follows:

$$\text{Var}[S(P_i)] \approx \left[\sum_{k=1}^{n} k a_{k,i} E[p_i]^{k-1}\right]^2 \text{Var}[P_i] \qquad \text{Eq. 12}$$

$$= \frac{\left[\sum_{k=1}^{n} k a_{k,i} p_i^{k-1}\right]^2}{y_i}.$$

Thus, the post-log correction process is performed on projection measurements after log-normalization, namely in the projection domain and not in the count domain. Equation 12 generally defines a gross form solution for estimating the variance for data that has gone through beam-hardening.

The determination of joint variance estimation at 76 may include determining additional beam-hardening correction as energy-weighted modeling at 86. In particular, it should be noted that beam-hardening correction compensates for the shift in the energy spectrum, which in turn impacts the energy-weighted case by producing higher signals for a fixed number of photons with a higher mean energy. The calculation of the mean energy approximation ê is similar in terms of the effect on the variance. Specifically, for the beam-hardening correction, the signal is corrected to a specific energy with the corresponding linear attenuation coefficient associated with the correction material (e.g., water). However, unlike the energy-weighted modeling at 76 for determining the line integral variance where there is a division by the mean energy, any fixed scaling factor may be used to maintain a value proportional to the variance as described above. Thus, another alternative to computing ê is to apply the beam-hardening variance modeling correction twice, in particular, once to model the energy weighting and once to model the beam-hardening correction itself.

Other methods may be used to determine a change in the measurement of the variance data. For example, some embodiments may determine a change in the variance of the measurement data transformed through a polynomial correction by using the square of a derivative of the polynomial correction. In other embodiments may determine a change in the variance using a polychromatic energy weighting by approximating a scaling value to convert the acquired raw measurement data to a variance-proportional domain.

Thereafter, data reconstruction is performed at 92. For example, the modified data at 74 is used in combination with the determined joint variance estimation at 76 (and optionally the electronic noise modeling at 80) to reconstruct an image of an object. The image reconstruction may be performed using any suitable data reconstruction process. Additionally, the modified data and the determined joint variance estimation (and optionally the electronic noise modeling) may be combined using a suitable technique, such as a matrix combination.

However, it should be noted that the various embodiments may be applied to the data prior to image or data reconstruction. For example, the raw data or pre-processed raw data may be modified based on the determined change in the variance (e.g., estimate of the change in variance) before image reconstruction. The various embodiments may be applied to projection data before image reconstruction. For example, an estimate of the variance in the projection may be determined in accordance with one or more embodiments and used in a de-noising algorithm that is applied in the projection space and that may be based on a physical model of the distribution of the noise in the projections. Thus, de-noising algorithms in the projection space operate only on the projection data, but may used one or more embodiments to provide information of the variance in the projection to minimize noise.

Thus, in accordance with various embodiments, the calculated variance values are used as an input for the data reconstruction. Additionally, the input signal from, for example, an energy-integrating detector is accounted for where the energy weighting has modified the statistics. Also, electronic noise from the acquisition system, which can further modify the statistics, also may be modeled. For example, quantum noise may result from the interaction of the radiation with the matter (e.g., x-rays interacting with a patient) or electronic noise may result, for example, from the conversion of analog to digital signals in the system.

Figure 6:
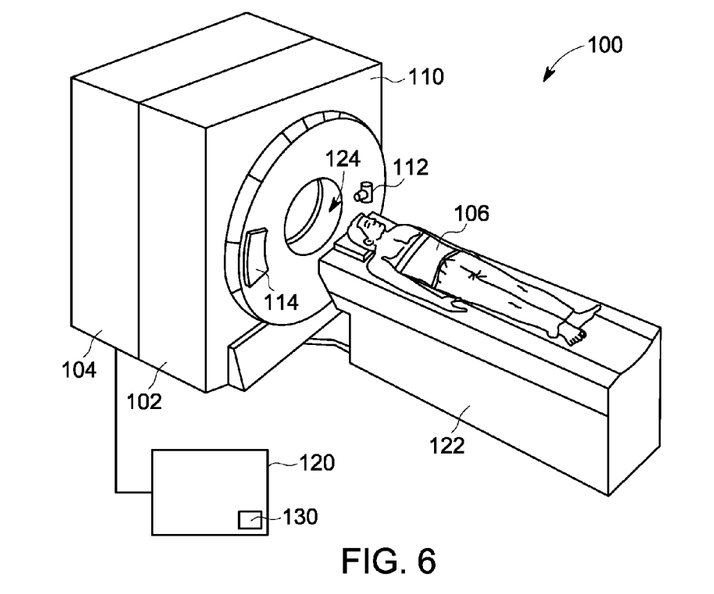
FIG. 6 is a pictorial view of an exemplary multi-modality imaging system formed in accordance with various embodiments.
Figure 7:
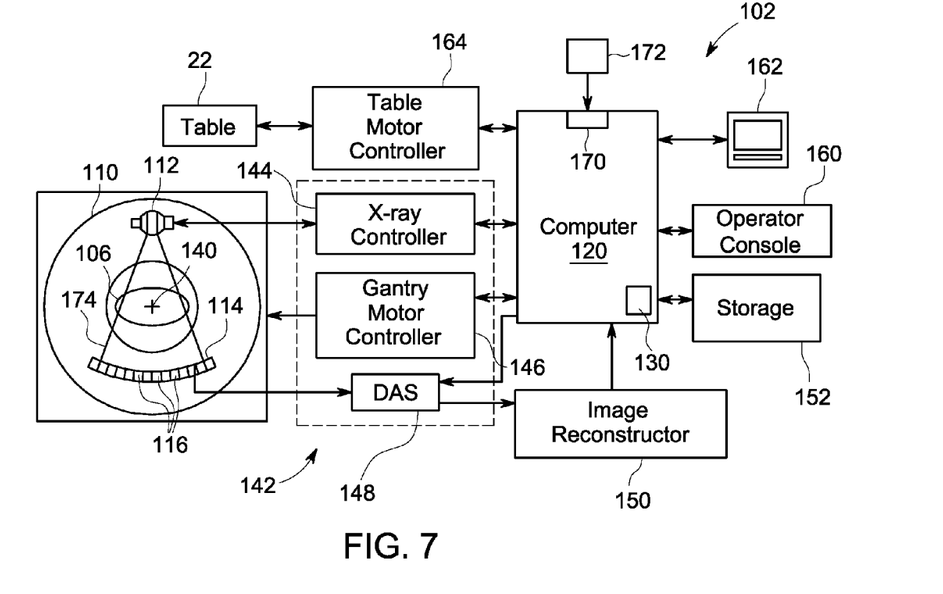
FIG. 7 is a block schematic diagram of the system illustrated in FIG. 6.

FIG. 6 is a pictorial view of an exemplary imaging system 100 that is formed in accordance with various embodiments. FIG. 7 is a block schematic diagram of a portion of the multi-modality imaging system 100 shown in FIG. 6. The imaging system may be embodied as a CT imaging system, a Positron Emission Tomography (PET) imaging system, a Magnetic Resonance Imaging (MRI) system, an ultrasound imaging system, an x-ray imaging system, a SPECT imaging system, an interventional C-Arm tomography imaging system, a CT system for a dedicated purpose such as extremity or breast scanning, and combinations thereof, among others. In the exemplary embodiment, the imaging system 100 is described with respect to a CT imaging system.

Although various embodiments are described in the context of an exemplary dual modality imaging system that includes a CT imaging system and a PET imaging system, it should be understood that other imaging systems capable of performing the functions described herein are contemplated as being used.

The multi-modality imaging system 100 illustrated includes a CT imaging system 102 and a PET imaging system 104. The imaging system 100 allows for multiple scans in different modalities to facilitate an increased diagnostic capability over single modality systems. In one embodiment, the exemplary multi-modality imaging system 100 is a CT/PET imaging system 100. Optionally, modalities other than CT and PET are employed with the imaging system 100. Also, the imaging system 100 may be a standalone CT single modality imaging system.

The CT imaging system 102 includes a gantry 110 that has an x-ray source 112 that projects a beam of x-rays toward a detector array 114 on the opposite side of the gantry 110. The detector array 114 includes a plurality of detector elements 116 that are arranged in rows and channels that together sense the projected x-rays that pass through an object, such as the subject 106. The imaging system 100 also includes a computer 120 that receives the projection data from the detector array 114 and processes the projection data to reconstruct an image of the subject 106. In operation, operator supplied commands and parameters are used by the computer 120 to provide control signals and information to reposition a motorized table 122. More specifically, the motorized table 122 is utilized to move the subject 106 into and out of the gantry 110. Particularly, the table 122 moves at least a portion of the subject 106 through a gantry opening 124 that extends through the gantry 110.

The imaging system 100 also includes a module 130 (e.g., the statistical reconstruction module 30) that is configured to implement the various methods and algorithms described herein. The module 130 may be implemented as a piece of hardware that is installed in the computer 120. Optionally, the module 130 may be implemented as a set of instructions that are installed on the computer 120. The set of instructions may be stand alone programs, may be incorporated as subroutines in an operating system installed on the computer 120, may be functions in an installed software package on the computer 120, and the like. It should be understood that the various embodiments are not limited to the arrangements and instrumentality shown in the drawings.

As discussed above, the detector 114 includes a plurality of detector elements 116. Each detector element 116 produces an electrical signal, or output, that represents the intensity of an impinging x-ray beam and hence allows estimation of the attenuation of the beam as it passes through the subject 106. During a scan to acquire the x-ray projection data, the gantry 110 and the components mounted thereon rotate about a center of rotation 140. FIG. 7 shows only a single row of detector elements 116 (i.e., a detector row). However, the multislice detector array 114 includes a plurality of parallel detector rows of detector elements 116 such that projection data corresponding to a plurality of slices can be acquired simultaneously during a scan.

Rotation of the gantry 110 and the operation of the x-ray source 112 are governed by a control mechanism 142. The control mechanism 142 includes an x-ray controller 144 that provides power and timing signals to the x-ray source 112 and a gantry motor controller 146 that controls the rotational speed and position of the gantry 110. A data acquisition system (DAS) 148 in the control mechanism 142 samples analog data from detector elements 116 and converts the data to digital signals for subsequent processing. For example, the subsequent processing may include utilizing the module 130 to implement the various methods described herein. An image reconstructor 150 receives the sampled and digitized x-ray data from the DAS 148 and performs high-speed image reconstruction, which may include statistical iterative reconstruction and variance modeling as described herein. The reconstructed images are input to the computer 120 that stores the image in a storage device 152. Optionally, the computer 120 may receive the sampled and digitized x-ray data from the DAS 148 and perform various methods described herein using the module 130. The computer 120 also receives commands and scanning parameters from an operator via a console 160 that has a keyboard. An associated visual display unit 162 allows the operator to observe the reconstructed image and other data from computer.

The operator supplied commands and parameters are used by the computer 120 to provide control signals and information to the DAS 148, the x-ray controller 144 and the gantry motor controller 146. In addition, the computer 120 operates a table motor controller 164 that controls the motorized table 122 to position the subject 106 in the gantry 110. Particularly, the table 122 moves at least a portion of the subject 106 through the gantry opening 124 as shown in FIG. 6.

Referring again to FIG. 7, in one embodiment, the computer 120 includes a device 170, for example, a floppy disk drive, CD-ROM drive, DVD drive, magnetic optical disk (MOD) device, or any other digital device including a network connecting device such as an Ethernet device for reading instructions and/or data from a computer-readable medium 172, such as a floppy disk, a CD-ROM, a DVD or an other digital source such as a network or the Internet, as well as yet to be developed digital means. In another embodiment, the computer 120 executes instructions stored in firmware (not shown). The computer 120 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 112 and the detector array 114 are rotated with the gantry 110 within the imaging plane and around the subject 106 to be imaged such that the angle at which an x-ray beam 174 (which may be the fan 35 of x-rays 36 shown in FIG. 1) intersects the subject 106 constantly changes. A group of x-ray attenuation measurements, i.e., projection data, from the detector array 114 at one gantry angle is referred to as a "view". A "scan" of the subject 106 comprises a set of views made at different gantry angles, or view angles, during one revolution of the x-ray source 112 and the detector 114. In a CT scan, the projection data is processed to reconstruct an image that corresponds to a two dimensional slice taken through the subject 106.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

As used herein, the term "computer" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software, which may be a non-transitory computer readable medium. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A non-transitory computer readable storage medium for reconstructing image data using a processor, the non-transitory computer readable storage medium including instructions to command the processor to:
   pre-process the raw measurement data, having an associated raw data variance, to modify the raw measurement data to form modified measurement data;
   determine a variance change in the raw data variance resulting from the modification to the raw measurement data during pre-processing when forming the modified measurement data; and
   reconstruct an image based on (i) the modified measurement data resulting from the pre-processing and (ii) the variance change determined.

2. The non-transitory computer readable storage medium of claim 1, wherein the instructions command the processor utilize a first process chain to pre-process the acquired raw measurement data and a parallel second process chain to determine the variance change.

3. The non-transitory computer readable storage medium of claim 2, wherein the parallel processes are performed one of concurrently or sequentially.

4. The non-transitory computer readable storage medium of claim 1, wherein the instructions command the processor to determine the variance change in the raw data variance using energy-weighted polychromatic modeling.

5. The non-transitory computer readable storage medium of claim 4, wherein the raw data variance is defined as:

$$\operatorname{Var}[-\ln(X)] \approx \frac{\operatorname{Var}[Y]}{E[Y]^2}$$

$$= \frac{\bar{e}^2 \sum_e \operatorname{Var}[N_i(e)]}{\left[\bar{e} \sum_e E[N_i(e)]\right]^2}$$

$$= \frac{\bar{e}^2 \sum_e N_i(e)}{\bar{e}^2 \left[\sum_e N_i(e)\right]^2}$$

$$= \frac{1}{\sum_e N_i(e)}$$

where Y is the acquired raw measurement, E[Y] is an expected value of Y, e is a mean photon energy, and N is a number proportional to measured photon counts.

6. The non-transitory computer readable storage medium of claim 1, wherein the instructions command the processor to determine the variance change in the raw data variance using a pre-log correction.

7. The non-transitory computer readable storage medium of claim 6, wherein the variance is defined as:

$$\mathrm{Var}[\hat{X}_i] = \frac{\sum_k \alpha_k^2 \mathrm{Var}[Y_k]}{\left[\sum_k \alpha_k E[Y_k]\right]^2}$$

where Y is the acquired raw measurement data, and $\alpha$ is a transformation variable.

8. The non-transitory computer readable storage medium of claim 1, wherein the instructions command the processor to determine the variance change in the raw data variance using a post-log correction.

9. The non-transitory computer readable storage medium of claim 8, wherein the variance is defined as:

$$\mathrm{Var}[S(P_i)] \approx \left[\sum_{k=1}^{n} k a_{k,i} E[p_i]^{k-1}\right]^2 \mathrm{Var}[P_i]$$

$$= \frac{\left[\sum_{k=1}^{n} k a_{k,i} p_i^{k-1}\right]^2}{y_i}.$$

where p is the acquired projection data transformed from the acquired raw measurement data, P is a random variable description of the projection data p, a is a transformation variable, and y is a measurement value of the acquired raw measurement data.

10. The non-transitory computer readable storage medium of claim 1, wherein the instructions command the processor to determine the variance change in the raw data variance using a beam-hardening correction as an energy-weighted modeling.

11. The non-transitory computer readable storage medium of claim 1, wherein the instructions command the processor to determine the variance change in the raw data variance of the measurement data transformed through a polynomial correction by using the square of a derivative of the polynomial correction.

12. The non-transitory computer readable storage medium of claim 1, wherein the instructions command the processor to determine the variance change in the raw data variance using a polychromatic energy weighting by approximating a scaling value to convert the acquired raw measurement data to a variance-proportional domain.

13. The non-transitory computer readable storage medium of claim 1, wherein the instructions command the processor to further perform electronic noise modeling.

14. The non-transitory computer readable storage medium of claim 13, wherein the variance including the modeled electronic noise is defined as:

$$\frac{Y + \sigma_e^2}{Y^2}$$

and the model is used as a statistical weight, such that Y is scaled by $$\frac{Y}{Y + \sigma_e^2},$$

where Y is the acquired measurement data and $\sigma$ is a standard deviation value.

15. The non-transitory computer readable storage medium of claim 1, wherein the acquired measurement data is acquired projection x-ray Computed Tomography (CT) data.

16. The non-transitory computer readable storage medium of claim 1, wherein the instructions command the processor to pre-process the raw measurement data to form the modified measurement data to correct for at least one of a varying system parameter or an object parameter.

17. A method for statistically iteratively reconstructing image data, the method comprising:
processing raw measurement data, having an associated raw data variance, to correct for at least one non-ideality of the acquired raw measurement data, the processing performed in a first data flow and resulting in pre-processed measurements;
determining in a second different data flow a variance change in the raw data variance of the raw measurement data resulting from the correction in the first data flow; and
reconstructing an image based on the pre-processed measurements and the determined variance change in the raw data measurement.

18. The method of claim 17, wherein the first and second data flows are parallel processes.

19. The method of claim 17, wherein determining the variance change comprises using at least one of energy-weighted polychromatic modeling, a pre-log correction, a post-log correction or a beam-hardening correction as an energy-weighted modeling to determine the variance change from the new data variance.

20. The method of claim 17, further comprising performing electronic noise modeling on the raw measurement data.

21. The method of claim 17, wherein the first and second data flows are performed one of concurrently or sequentially using one or more processors.

22. An imaging system comprising:
an imaging device; and
a processor coupled to the imaging device to receive raw measurement data from the imaging device, the raw measurement data having an associated raw data variance, the processor configured to:
modify the raw measurement data during pre-processing to form modified measurement data;
determine a variance change in the raw data variance of the raw measurement data resulting from the modification to the raw measurement data during the pre-processing; and
reconstruct an image based on the modified measurement data from the pre-processing and based on the variance change in the raw data variance.

23. The imaging system of claim 22, wherein the imaging device is a Computed Tomography (CT) scanner.

24. The imaging system of claim 22, wherein the processor is further configured to determine the variance change using at least one of energy-weighted polychromatic modeling, a pre-log correction, a post-log correction or a beam-hardening correction as an energy-weighted modeling in the variance determination.

25. A non-transitory computer readable storage medium for reconstructing image data using a processor, the non-transitory computer readable storage medium including instructions to command the processor to:
   pre-process the raw measurement data, having an associated raw data variance, to modify the raw measurement data to form modified measurement data;
   determine a variance change in the raw data variance resulting from the modification to the raw measurement data during pre-processing; and
   modify the pre-processed raw measurement data based on the determined variance change.

26. The non-transitory computer readable storage medium of claim 25, wherein the raw measurement data comprises projection data and the instructions command the processor to modify the projection data based on the determined change in the variance of the projection data, the determined change comprising an estimate of a change in the variance.

27. The non-transitory computer readable storage medium of claim 25, wherein the instructions command the processor to modify the raw measurement data in a projection space before an image reconstruction process.

* * * * *